Patented Jan. 22, 1946

2,393,327

UNITED STATES PATENT OFFICE 2,393,327

ESTERS

Carl M. Langkammerer, Wilmington, Del., assignor to E. I. du Pont de Nemours & Company, Wilmington, Del., a corporation of Delaware No Drawing. Application May 6, 1944,
Serial No. 534,518

5 Claims. (Cl. 260—481)

This invention relates to new compositions of matter and to processes for their preparation. More particularly it relates to new esters of aliphatic dithiadibasic acids and still more particularly to esters of aliphatic dithiadibasic acids which have at least two carbons between each ester group and the nearest sulfur atom.

An object of this invention is to provide esters of aliphatic dithiadibasic acids. A further object is to provide new and useful plasticizers and modifying agents for synthetic resins, cellulose derivatives, etc. A still further object is to provide a process for preparing esters of aliphatic dithiadibasic acids. Further objects will appear hereinafter.

These objects are accomplished by reacting an aliphatic dithiol with at least two molecular equivalents of an ester of an aliphatic carboxylic acid said acid having an ethylenic double bond, under the influence of heat and/or light and a catalyst. The compounds of this invention are all diesters of aliphatic dithiadibasic acids, having at least two hydrogen-bearing carbon atoms in contiguous relationship between each carboxyl group and the nearest sulfur atom and having at least two carbon atoms in the chain between the sulfur atoms. The radical of the alcohol from which the ester is formed may be aliphatic or aromatic, but is preferably aliphatic containing at least 4 and not more than 20 carbon atoms.

By aliphatic dithiadibasic acids are meant those aliphatic sulfur-containing acids corresponding to the named aliphatic dicarboxylic acids but having two heterocatenic sulfur atoms in place of two methylene groups in the main carbon chain.

The majority of the compounds of this invention may be represented as having the general formula,

R—OCO—X—S—Y—S—X—COOR wherein R is the radical of a monohydric aliphatic or aromatic alcohol, X is saturated aliphatic hydrocarbon having at least two carbons in the main chain, and Y is saturated aliphatic hydrocarbon containing at least two carbon atoms in the main chain.

In the preferred method of preparation, an alkane dithiol, for example, ethanedithiol, is heated with an ester of an ethylenically unsaturated carboxylic acid, preferably an aliphatic ester of an alpha,beta-ethylenically unsaturated carboxylic, preferably monocarboxylic, acid, e. g., an acrylate or an alkacrylate, in the presence of a small amount of pyridine, e. g., from 0.1 to 1% by weight based on total reactants, at 90–100° C. for several hours to several days depending on the length of time necessary to complete the reaction. The product is then washed with aqueous alkali and isolated by distillation, or the more volatile unreacted starting materials and impurities may be removed by distillation and thus separated from the higher boiling products of this invention. In this process, two moles of the unsaturated ester react with one mole of the alkane dithiol. It is preferred to use an excess (5% by weight or more) of the ester over the molecular requirements.

The more detailed practice of the invention is illustrated by the following examples, wherein parts given are by weight. There are, of course, many forms of the invention other than this specific embodiment.

Example I

Eight thousand nine hundred forty-five parts of butyl methacrylate (5% excess by weight), 2825 parts of ethanedithiol, and 30 parts of piperidine were placed in a reaction vessel and heated for 30 hours at 90–95° C. Twenty parts of piperidine was added after the reaction mixture had been heated for two hours and another 20 parts was added after the heating had proceeded for six hours. The oily reaction product was washed twice with 5000 parts of 10% aqueous sodium hydroxide solution and twice with 4000 parts of water. The oily layer was dried by mixing with anhydrous magnesium sulfate. The product was filtered from the magnesium sulfate and volatile impurities were removed by heating in a distillation apparatus at 165–170° C. at 4 mm. pressure for one and a half hours. Nine thousand five hundred fifty parts, equivalent to an 85% yield, of dibutyl 2,9-dimethyl-4,7-dithiasebacate was obtained.

Example II

Four hundred sixty parts of butoxyethoxyethyl methacrylate, 94 parts of ethanedithiol, and two parts of piperidine were heated at 90–100° C. for four and a half hours. The reaction product was diluted with an equal volume of ether and then washed three times with 10% aqueous sodium hydroxide. The product was dried in a manner similar to that used in the previous example and then the volatile impurities were removed by heating in a distillation apparatus at 210° C. at a pressure of 18 mm. The product was bis-(butoxyethoxyethyl) 2,9-dimethyl-4,7-dithiasebacate.

Example III

Three hundred four parts of methyl alpha-furylacrylate, 94 parts of ethanedithiol, and two parts of piperidine were heated at 90–100° C. for a total of 110 hours. Additional amounts of piperidine were added as follows: 1.5 parts after six hours heating and 1 part after 29 hours heating. The product, after washing with alkali and drying, was dimethyl 3,8-di-alpha-furyl-4,7-diothiasebacate.

Example IV

Five hundred parts of methyl methacrylate, 235 parts of ethanedithiol, and two parts of benzoyl peroxide were allowed to stand in direct sunlight for several days, the thiol content dropping from an original value of 22.5% to 9.7%. Distilled directly without fractionation, a thiol-free fraction was collected from 170 to 230° C. at two mm. pressure which was dimethyl 2,9-dimethyl-4,7-dithioasebacate.

Example V

Seven hundred fifteen parts of 4,7-dithiasebacic acid and 770 parts (5% excess) of 2-butaxyethanol, eight parts of concentrated sulfuric acid, and 1320 parts of benzene were heated in a reaction vessel of the conventional type for preparing esters in which the water is separated from the distillate and the benzene returned to the reaction. Eight hours of refluxing was required for removal of the theoretical amount of water. The product was then washed twice with water, then with dilute sodium carbonate and dried over anhydrous calcium sulfate. The excess benzene and volatile impurities were removed by heating on a distillation apparatus at 200° C. at 18 mm. pressure. Seven hundred parts of bis-(butoxyethyl) 4,7-dithiasebacate was obtained. This yield is 73.5% of the theoretical. This material may also be made directly from 4,7-dithiasebaconitrile and 2-butoxyethanol by heating with aqueous sulfuric acid.

Example VI

One hundred fifty parts of hexanedithiol-1,6, 200 parts of methyl methacrylate, and two parts of piperidine were heated at 90° C. for 40 hours. The thiol content of the reaction mixture dropped from 17.5% to 5.53%. The reaction mixture was washed with 10% aqueous sodium hydroxide, dried over magnesium sulfate, and heated in vacuo to remove a small amount of volatile material. The resultant product was dimethyl 2,13-dimethyl-4,11-dithiatetradecanedioate.

Example VII

Ninety-four parts of ethanedithiol, 581.2 parts of methyl oleate, and two parts of benzoyl peroxide were irradiated with ultraviolet light in a flask transparent to ultraviolet wavelengths above 2600 Å for a total of 60 hours. At the end of this time the thiol content was practically zero. The product was a mixture of isomers one of which was dimethyl 10,15-dioctyl-11,14-dithiatetracosanedioate.

Esters of aliphatic carboxylic acids having an ethylenic double bond in the carboxylic acid residue are useful in preparing the compounds of this invention. The esters are those of aliphatic or aromatic monohydric alcohols, preferably free from aliphatic unsaturation. A further preferred group are those esters having from four to twelve carbon atoms in the alcohol radical since the products formed from these esters by the process of this invention are of most interest as plasticizers. A still further preferred group are the esters of the alpha,beta-ethylenically unsaturated monocarboxylic acids, including the acrylates and the alkacrylates, e. g., the methacrylates. In addition to the esters employed in the examples, representative esters useful for preparing the products of this invention include the following: methyl acrylate, butyl methacrylate, benzyl methacrylate, butoxyethyl methacrylate, butoxyethoxyethyl acrylate, dimethyl maleate, diethyl fumarate, hexyl tiglate, dodecyl methacrylate, isobutyl undecylenate, methyl oleate, cyclohexyl crotonate, and the like.

The dithiols useful in preparing the new compounds of this invention are wholly aliphatic and have at least two carbon atoms in the chain linking the thiol groups. Although two is the minimum number of carbons between the thiol groups, the connecting chain may contain as many as eighteen carbons or more. The chain connecting the thiol groups is preferably hydrocarbon but may also be hydrocarbon interrupted by ether oxygen or sulfide sulfur. A representative list of the dithiols useful in this invention include the following: ethanedithiol; propanedithiol-1,2; propanedithiol-1,3; butanedithiol-1,2; 2-methylpropanedithiol-1,2; butanedithiol-2,3; butanedithiol-1,3; butanedithiol-1,4; hexanedithiol-1,6; octanedithiol-1,2; decanedithiol-1,10; 1-phenylethanedithiol-1,2; hexadecanedithiol-1,2; octadecanedithiol-1,18; 2,2'-dimercaptoethylether; 2,2'-dimercaptoethyl sulfide; beta-mercaptoethylcyclohexanethiol-3; and beta-mercaptoethylcyclohexanethiol-4.

The preferred thiols are those in which the connecting chain is lower aliphatic hydrocarbon, that is, a chain containing from two to six chain carbon atoms.

As mentioned above, the compounds of this invention are formed by the reaction of the previously described aliphatic dithiols and the previously described esters of aliphatic unsaturated carboxylic acids having ethylenic unsaturation in the carboxylic acid residue. In addition to those of the examples, representative esters of aliphatic dithiadibasic acids having at least two carbons between each ester group and the nearest sulfur atom include the following:

Bis(butoxyethyl) 4,7-dithiasebacate
Bis(butoxyethoxyethyl) 4,7-dithiasebacate
Dibutyl 2,9-dimethyl-4,7-dithiasebacate
Dicyclohexyl 2,9-dimethyl-4,7-dithiasebacate
Diisobutyl 2,5,6,9-tetramethyl-4,7-dithiasebacate
Diphenyl 5-methyl-4,7-dithiasebacate
Diethyl 3,8-di-alpha-furyl-4,7-dithiasebacate
Dibenzyl 3,8-dimethyl-4,7-dithiasebacate
Dimethyl 2,13-dimethyl-4,11-dithiatetradecanedioate
Dihexyl 3,8-diphenyl-4,7-dithiasebacate
Dimethyl 10,15-dioctyl-11,14-dithiatetracosanedioate
Dibutyl 12,16-dithiaheptacosanedioate
Dibutyl 4,10-dithia-7-oxatridecanedioate
Diamyl 4,7,10-trithiatridecanedioate
Didodecyl 2,9-dimethyl-4,7-dithiasebacate
Tetramethyl 3,6-dithia-1,2,7,8-octanetetracarboxylate The reaction of the dithiol with the ester of the unsaturated aliphatic acid by heating is materially aided by the presence of an amine as catalyst. Although piperidine is the preferred catalyst, other representative compounds useful for this purpose include alpha-pipecoline, morpholine, and organic bases in general. Other basic materials such as sodium ethylate, potassium hydroxide, sodium hydrosulfide, potassium hydrosulfide, and the like are also useful. Peroxides and ultraviolet light are also of assistance in the reaction.

In carrying out the reaction between the dithiol and the ester of the unsaturated monobasic acid to form the ester of the dithiadibasic acid, temperatures of 90–100° C. are usually satisfactory although higher or lower temperatures can also be used. The length of time for the completion of the reaction varies with the reactants, the temperature of the reaction, and the catalyst, and the reaction may be complete in from several hours to several days. Although the reactions illustrated by the examples are carried out in the absence of solvents, a mutual inert solvent may be used if desired. As examples of such solvents may be mentioned aromatic hydrocarbons such as benzene or toluene, aliphatic hydrocarbons, chlorinated aliphatic hydrocarbons or ethers. Although the reaction is generally carried out at atmospheric pressure, other pressure conditions may be used if desired. The amount of catalyst used in proportion to the other reactants is small; generally from 0.1 to 1% based on total reactants by weight is sufficient.

In addition to the process described above, the esters of the aliphatic dithiadibasic acids can also be prepared from the esters of the unsaturated carboxylic acids and the dithiols using a peroxide catalyst and actinic light, for example, sunlight as shown by Example IV. These new esters may also be prepared by direct esterification of the dithiadibasic acids with an alcohol. The dithiadibasic acids can be readily prepared by condensing two moles of an alpha,beta-ethylenically unsaturated mononitrile, for example, acrylonitrile or methacrylonitrile, with one of the above described dithiols under conditions similar to the direct reaction with the esters and then hydrolyzing the nitrile formed to the dicarboxylic acid and subsequently esterifying the acid with the desired alcohol. It is also possible to hydrolyze the dinitrile and esterify the resulting carboxylic acid by including an alcohol in the hydrolysis reaction mixture.

The esters of the aliphatic dithiadibasic acids of this invention are eminently suitable as plasticizers for synthetic resins and cellulose derivatives. They are also useful as insecticides, pharmaceuticals, and as rubber chemicals. The esters of this invention are also useful as intermediates in the synthesis of polyamides and polyesters.

The above description and examples are intended to be illustrative only. Any modification thereof or variation therefrom which conforms to the spirit of the invention is intended to be included within the scope of the claims.

What is claimed is:
1. An ester of 2,9-dimethyl-4,7-dithiasebacic acid.
2. Dimethyl 2,9-dimethyl-4,7-dithiasebacate.
3. An alkyl ester of 2,9-dimethyl-4,7-dithiasebacic acid.
4. Dibutyl 2,9-dimethyl-4,7-dithiasebacate.
5. Bis(butoxyethoxyethyl) 2,9-di-methyl-4,7-dithiasebacate.

CARL M. LANGKAMMERER.